June 5, 1956     J. R. HARRINGTON     2,749,223
APPARATUS FOR OPERATING INTERNAL COMBUSTION ENGINES
Filed June 18, 1952
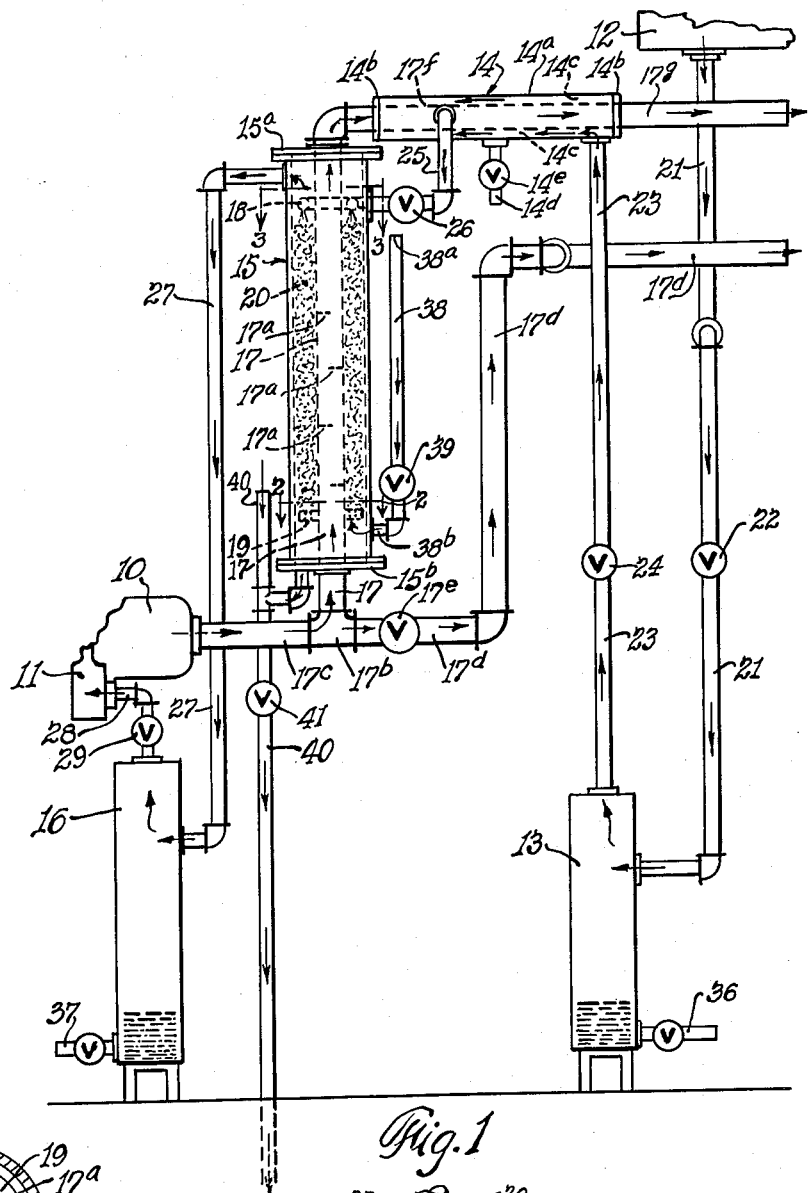
INVENTOR.
James R. Harrington
BY Frank Schraeder Jr.
Attorney United States Patent Office 2,749,223
Patented June 5, 1956

2,749,223

APPARATUS FOR OPERATING INTERNAL COMBUSTION ENGINES

James R. Harrington, Waurika, Okla., assignor of thirty-five one-hundredths to Frank J. Schraeder, Jr., Wichita, Kans.

Application June 18, 1952, Serial No. 294,281

7 Claims. (Cl. 48—107)

An object of the invention is to provide new and improved apparatus for generating a combustible fuel from crude petroleum adapted for use in operating an internal combustion engine while simultaneously utilizing in such apparatus the heat of the hot exhaust gas of the engine to generate the combustible fuel at the location of the engine; such fuel consisting of vaporized gasoline, emanating from a stream of crude petroleum flowing through a body of irregular pieces of inorganic material progressively imparting to the flowing petroleum heat at progressively increased temperatures radiating from the hot exhaust gas flowing in a direction reverse to the flow of the petroleum, and including means for feeding the vaporized gasoline so produced, together with an admixture of air, into the engine cylinder for operating the engine.

Another object of the invention consists in the provision of novel apparatus vaporizing part of a flowing stream of crude petroleum to produce a vaporized gasoline and feeding such vaporized gasoline together with an admixture of air through a carburetor into the engine cylinder for operating the engine; the hot engine-exhaust-gas being utilized for preheating the stream of crude petroleum and for subsequently vaporizing part of the preheated crude petroleum while air, also preheated by the engine exhaust gas, is injected by suction into the vaporizer for admixture therewith during the vaporization of the crude petroleum.

Still another object of my invention resides in the provision of a new and improved crude petroleum vaporizer disposed in a position conducive to gravitational flow of the petroleum through a body of irregular pieces of inorganic non-metallic material, preferably of cellular or porous structure such as, for example, coal coke adapted to be heated by a heat-emitting conduit extending through the vaporizer and through the body of inorganic material and extending exteriorly through end closure plates of the vaporizer; one end of the heat-emitting conduit being adapted to receive hot exhaust gas from an internal combustion engine cylinder for passage through the conduit to thereby heat the body of inorganic material whereby crude petroleum uniformly sprayed onto and progressively passed through the body of hot inorganic material while heated at progressively increased temperatures will produce a vaporized gasoline. The vaporized gasoline together with an admixture of air providing a vaporized combustible fuel mixture suitable for operating the engine.

A further object of the invention resides in the novel method of vaporizing a portion of a flowing stream of crude petroleum to produce gasoline fuel by utilizing the heat emitted from a conduit in intimate contact with a body of irregular pieces of cellular inorganic, non-metallic, material through which the stream of crude petroleum flows while subjected to progressively increased temperatures of such body during the flow of hot gases through the conduit in a direction reverse to the directional flow of the stream of the crude petroleum.

My experimental research indicates that in lieu of coal coke other materials may be used for the body of non-metallic inorganic material in the vaporizer such as, for example, igneous materials as a cellular type of volcanic lava, oil shale coke, and irregular pieces of other non-metallic inorganic material.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figure 1 is a diagrammatic illustration of apparatus embodying my invention; the illustrated apparatus being of one suitable form or type for practicing my invention and adaptable for use in my improvement for producing gasoline vaporized from crude petroleum utilizing a flow of hot exhaust gases of an engine to produce the vaporized gasoline.

Figure 2 is an enlarged cross-section of the vaporizer taken on line 2—2 of Fig. 1 showing the inorganic material supporting plate.

Figure 3 is also an enlarged cross section of the vaporizer taken on line 3—3 of Fig. 1 showing the petroleum spray ring.

Figure 4 illustrates a vaporized gasoline and air inlet connection secured to an engine intake manifold which may be used instead of a conventional carburetor for operating an internal combustion engine with the vaporized fuel.

The invention embodies novel means or apparatus for vaporizing a portion of a flowing stream of crude petroleum to produce vaporized gasoline adapted for use in an internal combustion engine as a mixture of vaporized gasoline and air, utilizing the hot exhaust gas of the engine for vaporizing the gasoline from the crude petroleum at or near the location of the engine.

For purposes of illustrating a practical application of my invention, the following description is directed to an exemplification of the invention as applied to an internal combustion engine driving an oil well pumping unit, the pumping unit being not shown and only a portion of the engine cylinder and carburetor being shown diagrammatically.

In the drawing, there are diagrammatically shown portions of an internal combustion engine cylinder, designated by numeral 10, and a carburetor designated by numeral 11.

As shown in the drawing, the apparatus consists of an elevated crude petroleum storage tank 12, a settling tank 13 for receiving the crude petroleum from the storage tank 12 to allow any possibly present water therein to settle to the bottom thereof, a preheater 14 for preheating the crude petroleum during its flow from the settling tank 13 into the vaporizer 15, and a volume storage tank 16 preferably provided for the vaporized gasoline.

The vaporizer 15 is preferably in the form of a vertically disposed elongated cylindrical metallic tank having upper and lower end closure plates respectively 15ª and 15ᵇ which are removably secured to flanged ends of the tubular body of the tank 15. The vaporizer tank could be positioned in an inclined position or in any position conducive to gravitational flow of the crude petroleum therethrough.

Extending preferably centrally through the tubular tank 15 and outwardly through suitable openings in the end closure plates 15ª and 15ᵇ is a metallic heat-emitting conduit 17 preferably containing within its interior a plurality of vertically spaced semicircular deflector plates 17ª, which are cast therein or may be spot-welded in place, for causing the hot exhaust gas to flow in a preferably tortuous path for enhanced heat conduction. The conduit 17 could be coiled within the tank 15.

Within and near the upper end of the vaporizing tank 15 is a suitably supported circular spray ring 18 fabricated from tubular metal of preferably circular cross-section and provided in its bottom side with a plurality of circularly spaced spray openings 18ª as more clearly shown in Fig. 3.

Within and near the bottom of the vaporizing tank 15 is a suitably supported metallic plate 19 containing a plurality of perforations 19ª and constituting a supporting base plate for a body of preferably irregularly shaped pieces of non-metallic, inorganic material such as cellular coke or similar matter consisting of a residue of cellular or porous carbonized material such as coal coke, shale oil coke or igneous matter such as volcanic lava of cellular texture.

The body of inorganic material, designated by numeral 20, extends upwardly from the base plate 19 to preferably within a distance of 1 to 3 inches below the spray ring 18.

The lower end of the vaporizer heating conduit 17 is connected to a T pipe fitting 17ᵇ one end of which is connected by conduit 17ᶜ to the outlet of the exhaust gas passage of the engine cylinder 10, the opposite end of the T fitting 17ᵇ is connected to an exhaust gas by-pass conduit 17ᵈ that is provided with a suitable valve 17ᵉ. In installations in oil fields subjected to and during low temperatures, the valve 17ᵉ may normally be closed, in fields subjected to and during high temperatures, the valve 17ᵉ may be regulated to by-pass some of the hot exhaust gas to the atmosphere through the by-pass conduit 17ᵈ to thereby selectively regulate the flow of the hot gases into the vaporizer heating conduit 17 and thus prevent excessive temperatures within the vaporizer.

The upper end of the vaporizer heating conduit 17 is connected to a horizontally extending conduit portion 17ᶠ that extends through the preheater 14 which is located close to and immediately above the top of the vaporizer 15. The outer conduit extension 17ᵍ that extends out of the preheater 14 is open to discharge the spent exhaust gas into the atmosphere.

As shown in the drawing, the preheater 14 consists of an outer tubular metallic casing 14ª larger in diameter than the inner conduit 17ᶠ and is provided at both ends with annular closure plates 14ᵇ to thereby provide therein a cylindrical preheating chamber 14ᶜ of annular cross-section closed at both extreme ends.

The tubular casing 14ª is provided with a bleeder pipe 14ᵈ connected to the bottom side thereof and located longitudinally of the member 14ª preferably centrally between the closed ends 14ᵇ and includes a valve 14ᵉ normally closing the passage through the bleeder pipe 14ᵈ.

Although most of the water, if any, within the crude petroleum will settle in the bottom of the settling tank 13, from which it may be discharged through the bleeder pipe 36, the bleeder pipe 14ᵈ functions as supplemental means for removing water from the petroleum that may be carried into the preheater.

The crude petroleum storage tank 12 is connected with the settling tank 13 by a conduit 21 at the upper half of the tank 13 and a valve 22 is provided in conduit 21 to regulate the rate of flow of the crude petroleum into the tank 13.

The upper end of the settling tank 13 is connected by conduit 23 with the outer or inlet end of the preheating chamber 14ᶜ which is coaxial with and surrounds the heating conduit portion 17ᶠ; a valve 24 controls the rate of flow of the crude petroleum from the settling tank 13 into the preheating chamber 14ᶜ.

Near its inner end the preheating chamber 14ᶜ is connected by discharge conduit 25 with the spray ring 18 within the vaporizer 15; a valve 26 controls the rate of flow of the crude petroleum into the spray ring 18.

The preheated crude petroleum is discharged from the spray ring 18 through a plurality of openings 18ª onto the upper end of the body of hot inorganic material, preferably coke designated by numeral 20, and during its progressive flow through the body of hot coke a fraction or part of the crude petroleum will become vaporized into a suitably volatile vaporized gasoline which when combined with the proper relative proportion of air forms a combustible fuel mixture suitable for operating an internal combustion engine.

The volume storage tank 16 for vaporized gasoline is connected by conduit 27 with the upper interior portion of the vaporizing tank 15.

The upper end of the vaporized gasoline storage tank 16 is connected by conduit 28 in any suitable manner to the carburetor 11 or to a fuel chamber that is in open communication with the throat of the engine carburetor, diagrammatically partly shown and designated by numeral 11; a valve 29 is provided in conduit 28 to regulate the rate of flow of the vaporized gasoline into the carburetor 11.

In certain installations, I have conveniently removed the engine carburetor and, in such installations, have employed the combined gasoline and air intake connection, illustrated in Fig. 4, which I connected to the engine manifold 30 and which consists of a complementary flanged connection 31 secured with bolts 32 to the manifold 30 and connected by a T fitting at one end to the vaporized gasoline conduit 28 and at its opposite end with an air intake nipple 33. The adjustable valves 34 and 35 are adapted for controlling respectively the rate of flow of the vaporized gasoline and air into the engine manifold 30.

As illustrated in the drawing, the flow of crude petroleum from the storage tank 12 into the vaporizer 15 is gravitational. I have preferably shown a settling tank 13 wherein any water present in the oil may settle to the bottom thereof and at intervals may conveniently be discharged therefrom through the valve-controlled bleeder pipe 36.

Where clear petroleum substantially free from water is available, the preheating chamber 14ᶜ may be directly connected with the storage tank 12 by conduit 21 and the settling tank 13 dispensed with; any small amount of moisture may be removed from the preheater 14 if desired through the valved bleeder pipe 14ᵈ.

The vaporized gasoline storage tank 16 is provided with a valved bleeder pipe 37 through which condensed gasoline may be conveniently discharged at intervals.

The vaporizing system is subjected to the suction existent in the engine manifold and this suction extends through the storage tank 16 into the vaporizer 15 and obviously must be partially relieved and for this purpose I provide an upwardly extending air intake pipe 38 having an upper open intake end 38ª and a lower discharge end 38ᵇ communicating with the heated interior space or chamber of the vaporizer tank below the coke-supporting plate 19; the atmospheric air thus admitted into the vaporizer is immediately heated and may readily flow upwardly through the openings 19ª in the plate 19 and through the body of hot inorganic material into admixture with the vaporized gasoline to thus permit the vaporized gasoline within the upper end of the vaporizer tank to be sucked into the storage tank 16 and therefrom into the engine manifold; the valve 39 controlling the amount and rate of flow of the air into the vaporizer tank to partially relieve the suction of the engine and thus control the rate of flow of the vaporized gasoline into the volume storage tank 16 from which tank 16 the flow of the vaporized gasoline is further subjected to control by the valve 29 before its discharge into the carburetor and in the event of the use of the connection shown in Fig. 4, the rate of flow and the relatively proportionate mixture of air and vaporized gasoline are subjected to control by the valves 35 and 34 respectively.

Since during the process of vaporization of crude petroleum herein employed only a very small fraction or part of the gasoline is removed therefrom, the residue flows downwardly through the body of hot coke into the bottom of the vaporizing tank and therefrom is discharged through the pipe 40 and casing head back into the well. The upper end of the pipe 40 is open to the atmosphere. Valve 41 is provided in the pipe 40 to regulate the volumetric flow of air into the pipe 40 to secure in conjunction with the valve 39 the proper balance of pressures in the system.

It will be understood that various changes in the details of construction and arrangement of parts, which have been herein described and diagrammatically illustrated for purposes of explaining an exemplary disclosure of one form and nature of the invention, may be made by those skilled in the art within the principle and scope of the invention as defined in the appended claims.

I claim:

1. In apparatus for operating an internal combustion engine with a carbureted mixture comprising combustible vapor derived from crude petroleum by heat emitted from the engine exhaust gas: the improvement which consists of a crude petroleum vaporizer comprising a tank containing a body of pieces of surface-extending material of irregular structure, said tank being disposed in a position conducive to gravitational flow of the petroleum therethrough, a heat-emitting conduit extending through said tank and said body of surface-extending material and having an inlet at one end thereof communicating with said exhaust gas outlet to thereby heat said surface-extending material, a casing having an elongated petroleum preheating chamber, the opposite end of said heat-emitting conduit extending exteriorly of said vaporizing tank through said petroleum preheating chamber, a petroleum feeding conduit communicating with a source of crude petroleum adapted for uniformly feeding the crude petroleum into said preheating chamber, a discharge conduit for said chamber adapted to discharge the preheated petroleum into said tank for continuous gravity flow through the heated body of said surface-extending material to thereby produce a fraction of gasoline vapor therefrom, means permitting discharge of the petroleum residue from said tank, means adapted for feeding the gasoline vapor from said tank together with an admixture of air into the intake manifold of said engine responsively to suction in the engine cylinder, and valve-regulated means for admitting air into said tank to partially relieve the suction of the engine projected into the vaporizing tank.

2. The improvement as set forth in claim 1 including spray means within said tank for receiving the flow of preheated petroleum from said preheating chamber discharge conduit for discharging the preheated petroleum into contact with said body of surface-extending material, in a plurality of spray streams.

3. The improvement as set forth in claim 1 and wherein said means for feeding the gasoline vapor from the vaporizing tank includes a volume storage tank interposed to receive the gasoline vapor prior to its admixture with air and flow into the engine manifold.

4. In apparatus for operating an internal combustion engine with carbureted gasoline vapor generated from crude petroleum by heat emitted from the engine exhaust gas outlet: the improvement which consists of a crude petroleum vaporizer comprising a vertically disposed tank having upper and lower end closure plates, a supporting plate mounted within the lower end of said tank, a spraying device mounted within the upper end of said tank, a heat-emitting conduit within said tank having lower and upper portions extending exteriorly of said tank constituting respectively intake and exhaust extensions, said tank adapted to contain a body of pieces of coke extending within said tank between said supporting plate and said spraying device and disposed adjacent to said heat-emitting conduit, a conduit connecting said engine exhaust gas outlet with said intake extension, an elongated crude petroleum preheating casing having closed ends to provide a chamber therein, said conduit exhaust extension extending through said casing, means providing a flow of crude petroleum through said chamber and therefrom through said spraying device onto the top of and through the heated body of coke whereby a fraction of said petroleum is vaporized into gasoline and the residue flows therethrough to the lower end of said tank, means permitting discharge of the residue petroleum from said tank, and means connected with the upper end of said tank permitting a metered flow of the vaporized gasoline for admixture with a metered flow of air into the intake manifold of the engine for operating the engine.

5. In apparatus for operating an internal combustion engine with vaporized fuel generated from crude petroleum by heat emitted from the engine, the improvement comprising in an elongate vaporizer tank disposed and adapted for gravitational flow of crude oil therethrough, a heat-emitting conduit extending longitudinally therethrough and having one end adapted to connect to the engine exhaust gas conduit, surface-extending means within the tank around and in contact with the exhaust heat conduit, means to feed crude oil over said surface-extending means in the upper part of the tank, a valved outlet for oil collecting in the lower part of the tank, valved means to withdraw oil vapors at the upper part of the tank, said valved means being adapted for connection to the combustion engine fuel intake, a conduit at the bottom of the tank communicating with the atmosphere, and also a valved air inlet means in the lower part of the tank, whereby gas is vaporized at substantially atmospheric pressure from the oil at the exhaust heat temperatures intermixed with air, and both air and vapor flow up to said vapor withdrawal means through oil descending over the surface-extending means, and the effective partial pressures and temperatures in the vaporizer are controlled.

6. Apparatus as claimed in claim 5 comprising a preheater for the crude oil feed, means to transfer heat from the combustion engine to crude oil feed in the preheater and means to conduct the oil thus preheated to gravitational flow over the surface-extending means in contact with the exhaust heat conduit.

7. In apparatus for operating an internal combustion engine with vaporized fuel generated from crude petroleum by heat emitted from the engine, the improvement comprising in an elongate vaporizer tank disposed and adapted for gravitational flow of crude oil therethrough, a heat-emitting conduit extending longitudinally therethrough and having one end adapted to connect to the engine exhaust gas conduit, surface-extending means within the tank around and in contact with the exhaust heat conduit, means to feed crude oil over said surface-extending means in the upper part of the tank, an outlet to discharge petroleum residue from the lower part of the tank, valved means to withdraw oil vapors at the upper part of the tank, said valved means being adapted for connection to the combustion engine fuel intake, a conduit at the bottom of the tank communicating with said outlet and the atmosphere, and also a valved air inlet means in the lower part of the tank, whereby gas is vaporized at substantially atmospheric pressure from the oil at the exhaust heat temperatures intermixed with air, and both air and vapor flow up to said vapor withdrawal means through oil descending over the surface-extending means.

References Cited in the file of this patent

UNITED STATES PATENTS

| | | |
|---|---|---|
| Re. 13,655 | Constantinescu | Oct. 28, 1913 |
| 546,175 | Mery | Sept. 10, 1895 |
| 1,046,542 | Bates | Dec. 10, 1912 |
| 1,366,242 | Caldwell | Jan. 18, 1921 |
| 1,624,270 | Mathes | Apr. 12, 1927 |
| 2,079,586 | Atwell | May 4, 1937 |
| 2,080,420 | Havekost et al. | May 18, 1937 |
| 2,185,549 | Gault | Jan. 2, 1940 |
| 2,285,905 | Cummingham et al. | June 9, 1942 |

FOREIGN PATENTS

| | | |
|---|---|---|
| 244,423 | Great Britain | June 3, 1926 |